United States Patent Office 3,377,294
Patented Apr. 9, 1968

3,377,294
METHOD FOR DETECTING MOISTURE
George D. Davis, Creve Coeur, Rodney D. Beckham, St. Ann, and Loyd W. Fannin, Creve Coeur, Mo., assignors to Monsanto Company, St. Louis, Mo., a corporation of Delaware
No Drawing. Continuation-in-part of application Ser. No. 83,354, Jan. 18, 1961. This application Jan. 22, 1965, Ser. No. 427,498
5 Claims. (Cl. 252—408)

This application is a continuation-in-part of application Ser. No. 83,354, filed Jan. 18, 1961, now abandoned.

The present invention relates to the use of molecular sieves as drying agents. More particularly, the present invention relates to a method for the detection and measurement of moisture and to a specifically modified molecular sieve drying composition capable of indicating both the presence and quantity of water adsorbed therein.

Molecular sieves are crystalline adsorbents which are both naturally occurring and synthetic. They may vary in composition, but generally contain the elements silicon, aluminum and oxygen as well as alkali and/or alkali earth metals, e.g., sodium and calcium, respectively. Most commercially available molecular sieves are synthetic sodium-calcium-alumino-silicate crystals. As synthesized, these crystals contain water of hydration, which when removed by heating, leaves a geometric, intercrystalline network of empty cavities connected by channels of uniform diameter. The external openings of these channels are called pores, and it is through these openings or pores that materials may be absorbed. These pores may range in diameter from 3 to 15 angstroms or higher, though presently the molecular sieves finding the greatest utility have pore diameters of 4 to 5 angstroms.

Molecular sieves have both a strong affinity and a high capacity for water and are, therefore, very useful in the drying of water containing liquids and gases. A number of processes and utilities for molecular sieves as drying agents have been developed and reported in the prior art. Such processes and utilities generally involve the passing of water containing liquids or gases into contact with molecular sieves until the molecular sieves have adsorbed water until "loaded" or until their maximum adsorptive capacity is reached. After the molecular sieves have been loaded to capacity with water, they must then be regenerated. Regeneration generally takes the form of heating the water loaded molecular sieves to 400 to 600° F. In many cases, it is preferable to pass an inert purge gas over the surface of the molecular sieves.

One of the primary problems in operating molecular sieve drying processes is in knowing to what extent the molecular sieve is water loaded. The capacity of a given molecular sieve for water is generally known or may be determined experimentally as may be a given water containing liquid or gas stream. Thus, by simple calculation, the amount of water adsorbed into the sieve at any given time may be readily obtained. However, in many instances, the water content of the water containing liquid or gas stream will vary perodically or may be continually varying.

It is an object of the present invention to provide a method for detecting and measuring the presence of moisture in a gaseous or liquid atmosphere and to a particular composition useful therein. Another object of the present invention is to provide a method and composition useful therein whereby water is adsorbed from water containing media and its presence detected and measured by variations in color of the composition. It is also an object of this invention to provide a method of making a moisture indicating composition capable of indicating both the presence and quantity of moisture in a liquid or gaseous atmosphere. Additional objects will become apparent from the following description of the invention herein disclosed.

In fulfillment of these and other objects, a method for detecting and measuring moisture in a moisture-containing medium has been found, which method comprises contacting said moisture-containing medium with a molecular sieve, a portion of the ions of which have been replaced with manganese by ion exchange, the amount of manganese being sufficient to cause a concentration of at least 0.1 percent by weight manganese in the molecular sieve, the manganese-containing molecular sieve having been heated in the presence of an oxygen-containing gas at a temperature in excess of 525° C. for a time sufficient to impart a turquoise color to said molecular sieve and to convert said manganese to an oxide of manganese, observing the change in color of said manganese-containing molecular sieve as moisture is adsorbed thereby, the degree of change in the color of said molecular sieve being indicative of the amount of moisture in said moisture-containing medium.

The moisture indicating molecular sieve of the present invention is prepared by treating a molecular sieve with a solution containing manganese ions under conditions such that a portion of the ions of the molecular sieve are replaced with manganese by ion-exchange, the amount of manganese exchanged into the molecular sieve being such as to cause a concentration of manganese in the finished composition of at least 0.1 percent by weight, drying the manganese-containing molecular sieve, and then heating the manganese-containing molecular sieve in the presence of an oxygen-containing gas at a temperature in excess of 525° C. until the molecular sieve has turned turquoise in color.

The following examples will serve to further explain and to illustrate the present invention. It is to be understood that these examples are in no way to be construed as limiting to the present invention.

Example I

Approximately 353.3 grams of a calcium-sodium-alumino-silicate having intercrystalline cavities with interconnecting channels and external pores of 5 angstroms diameter and marketed as Linde Type 5A molecular sieve were placed in a solution comprised of 49.47 grams of $MnCl_2 \cdot 4H_2O$ in 1200 milliliters of water. The molecular sieves were in the form of $\frac{1}{16}$ inch diameter cyclindrical pellets. The molecular sieves were allowed to remain in the solution for 24 hours to insure complete ion exchange.

The pellets were then filtered from the solution, water washed and slowly dried by heating at a temperature of 110 to 120° C. for a period of time and then the temperature was gradually raised to a maximum of about 550° C. and maintained in the presence of air for 48 hours. At the end of this time, the molecular sieve was turquoise in color. The molecular sieves so treated were found to contain 2.43 percent by weight manganese.

Example II

On preparation, as shown in Example I, the manganese containing molecular sieve was turquoise in color. The turquoise sieve was exposed to moisture and it was found that upon contact with the moisture there was a rapid change from turquoise to rose-pink. As the molecular sieve became further loaded with water, the color changed from the rose-pink to a very light tan color. It was found that the amount of water adsorbed into the molecular sieve containing manganese could be correlated to some extent with the color of the molecular sieve merely by visual color observation. This color-water loading correlation was, of course, subject to slight variation due to the visual color judgement. This color-water loading correlation may be described as follows.

Color:                               Weight percent water
    Turquoise _____ 0.
    Rose-pink _____ 1 or less.
    Light-rose _____ 2.
    Tan _____ 3.
    Light tan _____ 19.

The above color-water content correlation is based on visual color judgement as previously stated. It is indicative, however, of the relatively wide range of color changes which take place between 0 and approximately 19 weight percent water loading in the moisture indicating composition of the present invention. By accurate measurement of the color changes using proper instruments, a close correlation between the color and water-content may be obtained.

Example III

This example illustrates the practical adaptation of the manganese containing molecular sieve moisture indicating composition of the present invention.

A ¾ inch diameter glass column was packed to a depth of approximately 2½ inches with 16.4 grams of the molecular sieve moisture indicator composition prepared in Example I. Hydrogen, wetted by being bubbled through water, was passed through the molecular sieve bed at a flow rate of 0.2 liter per minute. It was noted that on first contact of the wet hydrogen with the molecular sieve bed that the lower most pellets in the bed changed from turquoise to rose-pink, then through light-rose and tan to a final color of light tan. The pellets above remained turquoise in color. However, as more wet hydrogen was passed through the bed this area of color change gradually progressed up the sieve bed. Thus, there was in the molecular sieve bed three distinct color bands or areas. An upper, unwetted area remained turquoise while a lower thoroughly wetted portion was light tan in color. Between these two color bands or portions was a relatively narrow band wherein the color was comprised of shades of rose-pink. These color bands or portions of the molecular sieve bed remained separate and distinct with the light-tan or wetted portion gradually increasing in height with of course, the simultaneous decrease in size of the turquoise portion. Finally, after approximately 8 hours, the entire bed was light tan in color indicating that the entire bed was wetted to an amount equivalent to its maximum color indication. At this point the flow of wet hydrogen was stopped. The molecular sieve bed was found to be water loaded to a practical operating capacity and thus would then be regenerated by drying.

To illustrate the criticality of the method of preparation of the moisture detecting manganese containing molecular sieves of the present invention a molecular sieve of the type defined in Example I was treated with an aqueous solution of $MnCl_2 \cdot 4H_2O$ as described in Example I to effect ion-exchange of calcium ions of the molecular sieve with manganese ions of the solution. The resulting manganese containing molecular sieve was then treated in various ways and at various temperatures. The following table summarizes the various means of treating the manganese containing molecular sieve and the results obtained thereby.

| Atmosphere | Temperature, °C. | Time (hrs.) | Results |
|---|---|---|---|
| Nitrogen | 500 | 48 | No color change. |
| Hydrogen | 500 | 48 | Do. |
| Air | 500 | 48 | Do. |
| Nitrogen | 550 | 48 | Do. |
| Hydrogen | 550 | 48 | Do. |
| Air | 550 | 48 | Turquoise. |
| Air | 520 | 48 | Very slight color change. |

From the above table, it is apparent that temperatures in excess of 525° C. and an oxygen containing atmosphere are necessary to oxidize the manganese containing molecular sieve to the state necessary to its use as a moisture detecting composition.

The new and novel water indicating adsorbent composition of the present invention may be prepared from any zeolite capable of adsorbing and holding water. The zeolite may be naturally occuring or synthetic and may contain external pore diameters of 3 to 15 angstroms or higher. The molecular sieve may be in the form of pellets or it may be used in powdered form. A very thorough discussion of the molecular sieve zeolites which may be used in the present invention is found in U.S. Patent 2,920,038. The preferred molecular sieves for the present invention are those zeolites which are calcium and/or sodium-alumino-silicates. It is also preferred that molecular sieves having pore diameters of 4, 5 and 13 angstroms be used. This preference is based on practical availability, however, since such sieves are readily available commercially at present. The molecular sieve may have pore diameters of any size so long as they are large enough to admit water molecules into the internal, intercrystalline cavities.

The water indicating adsorbing compositions of the present invention are prepared by treating a synthetic or naturally occurring zeolite with a solution containing manganese ions dispersed therethrough. The solution containing the manganese ions may be prepared by dissolving a manganese salt in a suitable solvent. Water is a preferred solvent primarily because of its availability, ease of handling, etc. and also because of its inert qualities relative to molecular sieves. The choice of water as a preferred solvent is not meant to be limiting, however, since its choice is purely one of practicality. Any solvent which will dissolve the chosen manganese salt may be utilized, so long as it does not chemically interfere with the treatment of the molecular sieves. Caution should be exercised in choosing both solvent and manganese salt, so that water or solvent insoluble compounds are not formed by the ion exchange reaction whereby the manganese ions are placed within the molecular sieve. After the manganese salt solution is prepared the molecular sieve material is immersed therein for a period of time, the time being somewhat dependent on the concentration of manganese desired to be exchanged into the molecular sieve and the amount of manganese in the salt solution, the temperature and other such factors. As a practical matter, the immersion of the molecular sieve in the manganese containing solution is generally carried out at room temperatures or temperatures of 20 to 25° C. This temperature is not to be limiting however, since it is merely preferred because of the universal preference for operating any reaction without external heating or cooling. The temperatures for reaction may be as low as 0° C. and lower or as high as 150° C. and higher. Variation of temperature within practical limits, above or below the above cited range, will only affect the rate of the ion exchange reaction taking place within the solution containing the manganese ions and the molecular sieve. To insure thorough contact between the manganese ions and the molecular sieves, it may be desirable at times to provide some form of mild agitation.

After ion-exchange is complete to the extent desired, the manganese containing molecular sieves are removed from the solution, dried and then subjected to oxidation conditions as hereinbelow defined. Drying is usually carried out by heating the manganese containing molecular sieve to 100 to 350° C. for sufficient time to attain visible dryness of the moelcular sieve. The drying step may be carried out in the presence of air, nitrogen, helium, argon, methane, ethane, propane, and other such gases.

The most critical step in the preparation of the manganese containing molecular sieve moisture-detecting compositions of the present invention is the oxidation step. Oxidation, of course, must be carried out in the presence of air or other oxygen containing gas. The oxidation temperature must be in excess of 525° C. As a practical matter, the oxidation temperature should not exceed 700° C. since at temperatures above this, damage to the molecular sieve structure becomes likely. Preferably, oxidation is carried out in the presence of air at 550° C. to 650° C. The oxidation step is carried out until the molecular sieve has turned turquoise in color.

The concentration of manganese within the molecular sieve adsorbent-indicator of the present invention, generally will range from 0.5 to 15.0 weight percent of the modified molecular sieve. A more preferred range of manganese concentrations within the modified molecular sieve is 1.0 to 5.0 weight percent of the total composition. These ranges are not to be restrictive to the present invention, since amounts of manganese ranging from as low as 0.1 percent by weight of the total modified molecular sieve to as high as the largest amount which may be exchanged into a particular molecular sieve will impart moisture indicating qualities to the molecular sieves and are therefore within the scope of the present invention.

In determining the amount of manganese exchanged into the molecular sieve, standard quantitative analytical means may be employed. One such method involves analyzing the manganese ion containing solution, combined with the washings from the treated molecular sieve after completion of the immersion step, and then comparing the amount of manganese in the solution and washings after immersion with the amount in the solution prior to immersion. This will indicate the amount of manganese exchanged into the molecular sieve. The method whereby the amount of manganese placed in the molecular sieve is determined is of no criticality to the present invention, however, and any method may be used.

The present invention may be utilized in many different ways. Due to its high sensitivity to small amounts of water, it may be utilized to indicate trace amounts of moisture contained in gases or liquids. An almost opposite use is found in the utility illustrated by Example III, wherein the manganese containing sieve was utilized to indicate the practical operating loaded capacity of a molecular sieve water adsorption bed. Between these two extremes may be found a host of specific applications. For example, a precise correlation between the color shades and the water content of the feed would make possible relatively accurate and very simple water analysis of water containing liquids and gases. Another specific use for the present invention would be as a relative humidity indicator.

Regeneration of the moisture detecting manganese containing molecular sieves of the present invention after they have become loaded with adsorbed water, is most often carried out by heating the molecular sieve. Usually, a gas is flowed over the molecular sieve during regeneration. This gas may be air or other oxygen containing gas or may be nitrogen, helium, argon, methane, ethane, propane or any of the other gases useful as a drying gas. Regeneration temperatures may vary widely, but usually range from 100 to 600° C., the higher the temperature, the more rapid the desorption of adsorbed moisture.

What is claimed is:

1. A method for detecting and measuring moisture in a moisture-containing gas which comprises contacting said moisture-containing gas with a molecular sieve selected from the group consisting of calcium-alumino-silicates, sodium-alumino-silicates, and calcium-sodium-alumino-silicates, a portion of the ions of which have been replaced with manganese by ion exchange, the amount of manganese being sufficient to cause a concentration of 0.5 to 15.0 percent by weight manganese in the molecular sieve, the manganese-containing molecular sieve having been heated in the presence of an oxygen-containing gas of the type which will permit oxidation, at a temperature of 550 to 650° C. for a time sufficient to impart a turquoise color to said molecular sieve, observing the change in color of said manganese-containing molecular sieve as moisture is adsorbed thereby, the degree of change in the color of said molecular sieve being indicative of the amount of moisture in said moisture-containing gas.

2. The method of claim 1 wherein the amount of manganese in said manganese-containing molecular sieve is within the range of 1 to 5 percent by weight.

3. The method of claim 1 wherein said oxygen-containing gas is air.

4. A method of preparing a moisture indicating adsorbent composition which comprises treating a molecular sieve selected from the group consisting of calcium-alumino-silicates, sodium-alumino-silicates, and calcium-sodium-alumino-silicates, with a solution of a manganese salt in a solvent which does not chemically interfere with the exchange reaction, under conditions such that a portion of the ions of said molecular sieve are replaced with manganese by ion exchange, the amount of manganese exchanged into the molecular sieve being such as to cause a concentration of manganese in the finished composition of 0.5 to 15 percent by weight, drying the manganese-containing molecular sieve in the presence of an oxygen-containing gas of the type which will permit oxidation, at a temperature of 550 to 650° C. until the molecular sieve has turned turquoise in color.

5. The method of claim 4 wherein said oxygen-containing gas is air.

References Cited

UNITED STATES PATENTS

| 2,284,981 | 6/1942 | Martin et al. | 252—194 |
| 2,882,244 | 4/1959 | Milton | 252—455 |
| 3,078,635 | 2/1963 | Milton | 55—75 X |

LEON D. ROSDOL, *Primary Examiner.*

M. WEINBLATT, *Assistant Examiner.*